US006843464B2

(12) United States Patent
Stoecklein et al.

(10) Patent No.: US 6,843,464 B2
(45) Date of Patent: Jan. 18, 2005

(54) VALVE FOR CONTROLLING LIQUIDS

(75) Inventors: Wolfgang Stoecklein, Stuttgart (DE); Dietmar Schmieder, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 10/297,799

(22) PCT Filed: Apr. 9, 2002

(86) PCT No.: PCT/DE02/01293

§ 371 (c)(1),
(2), (4) Date: Dec. 10, 2002

(87) PCT Pub. No.: WO02/084106

PCT Pub. Date: Oct. 24, 2002

(65) Prior Publication Data

US 2003/0132410 A1 Jul. 17, 2003

(30) Foreign Application Priority Data

Apr. 11, 2001 (DE) ........................................ 101 18 053

(51) Int. Cl.[7] ................................................ F16K 31/12
(52) U.S. Cl. .................................... 251/57; 251/129.06
(58) Field of Search .............................. 257/57, 129.06; 239/88, 96, 102.2

(56) References Cited

U.S. PATENT DOCUMENTS 4,560,871 A * 12/1985 Bowman et al. .............. 251/57
5,779,149 A * 7/1998 Hayes, Jr. ................ 239/533.9
5,884,848 A * 3/1999 Crofts et al. ........... 251/129.06
6,076,800 A * 6/2000 Heinz et al. ........... 251/129.06
6,427,968 B1 * 8/2002 Stoecklein ................... 251/57
6,460,779 B1 * 10/2002 Boecking ............... 251/129.06

FOREIGN PATENT DOCUMENTS

DE 19843534 A * 3/2000
DE 19843578 A * 3/2000
JP 0436062 A * 2/1992

OTHER PUBLICATIONS

International Search Report, PCT/DE02/01293, Aug. 12, 2002.*

* cited by examiner

*Primary Examiner*—John Bastianelli
(74) *Attorney, Agent, or Firm*—Ronald E. Greigg

(57) ABSTRACT

A valve for controlling fluids, having a piezoelectric actuator unit for actuating a valve member is proposed, which has at least one adjusting piston and at least one actuating piston that is guided in a valve body and actuates a valve closing body, which valve closing body cooperates with at least one valve seat embodied on the valve body and in the closing direction disconnects a control bore from an outlet chamber, from which a return conduit branches off, wherein between the adjusting piston and the actuating piston, a hydraulic chamber is disposed, which transmits a motion of the adjusting piston to the actuating piston. To keep the size of the actuator unit small, the actuating piston, at least when the valve closing body is closed, is supported essentially in a hydraulically force-balanced fashion.

20 Claims, 2 Drawing Sheets

VALVE FOR CONTROLLING LIQUIDS

CROSS-REFERENCE TO RELATED APPLICATIONS

This application is a 35 USC 371 application of PCT/DE02/1293 filed on Apr. 9, 2002.

FIELD OF THE INVENTION

The invention directed to an improved valve for controlling fluids and more particularly to a valve used in conjunction with a fuel injector for injecting fuel into the combustion chamber of an internal combustion engine.

DESCRIPTION OF THE PRIOR ART

A valve of the type with which this invention is concerned is known in the industry and is used for instance in conjunction with an injection valve, in particular an injection valve of a common rail injection system for Diesel internal combustion engines. An injection valve of this kind has a valve control piston, which forms a structural unit with a nozzle needle and is surrounded at least partly by a chamber which communicates via a fuel supply line with a high-pressure connection and contains fuel. The nozzle needle cooperates with a correspondingly embodied valve seat, so that depending on the position of the valve control piston, the fuel injection into the combustion chamber of the engine can be controlled via an opening in the injection valve leading to the combustion chamber. The position of the valve control piston and thus of the nozzle needle is fixed by means of the valve for controlling fluids described at the outset, which is In operative communication with the valve control piston via a so-called valve control chamber.

The valve control chamber is in operative communication via an inlet throttle with the fuel supply line and via a so-called outlet throttle with the valve mentioned at the outset, or so-called valve control module, and adjoins the free end, that is, the end remote from the nozzle needle, of the valve control piston. This design makes a purposeful pressure buildup and pressure reduction, tripped by the valve control module and described below, possible in the valve control chamber.

In the closing direction of the valve control module, which is embodied like a valve, the high pressure exerted via the inlet throttle, or in the case of a common rail injection system the so-called rail pressure, prevails in the valve control chamber. Under these pressure conditions, the valve control piston and thus the nozzle needle as well are in the closing direction. If the piezoelectric actuator unit, for instance, of the valve control module is then actuated, the valve closing body of the valve control module opens. As a result, the fuel located in the valve control chamber can flow out into a return conduit via a control bore and an outlet chamber that are associated with the valve control module; the pressure in the valve control chamber accordingly drops. As a result, the structural unit comprising the valve control piston and the nozzle needle is displaced in the direction of the valve control chamber, so that the opening leading to the combustion chamber is uncovered and fuel is injected into the combustion chamber. As soon as the valve closing body of the valve control module is returned to the closing direction again, the so-called rail pressure builds up again in the valve control chamber via the inlet throttle, and the valve control piston is thus moved back into the closing direction. As a result, the injection valve is tightly closed off from the combustion chamber, and no fuel reaches the combustion chamber.

BACKGROUND OF THE INVENTION

In the known injection valve of the type defined at the outset and described above, which is embodied for instance as a single-seat valve, there is the disadvantage that a high opening force is required to actuate the nozzle needle. Moreover, the refilling of the hydraulic chamber, which is always necessary because of leakage, proves complicated and expensive.

SUMMARY OF THE INVENTION

The valve of the invention in which the actuating piston, at least when the valve closing body is closed, is supported essentially in a hydraulically force-balanced fashion, has the advantage over the prior art that only considerably lesser forces are required to open the valve closing body. This is because—unlik in the valves of the prior art—the actuating piston need not be opened counter to the fluid pressure acting on the valve closing body, or in the case of a common rail injection system counter to the so-called rail pressure, which can be as high as 1.6 kbar.

It is hence possible to use piezoelectric actuators of a smaller size, which in turn leads to a reduction in the cost of the switching valve. Alternatively or in addition, the actuator, in particular a piezoelectric actuator, in the valve of the invention can also be triggered with a lower voltage, which in turn leads to a reduction in the energy required, compared to the valves of the prior art.

In an advantageous embodiment of the valve of the invention, the valve closing body is preferably a constituent part of the actuating piston. Advantageously, the actuating piston has an axial bore that branches off from the control chamber and extends through the actuating piston. This axial bore leads for instance from the control chamber, disposed upstream of the valve seat, to a chamber disposed on the opposite side of the actuating piston, so that in this chamber, at least when the valve closing body is closed, the pressure prevailing in the control chamber also prevails.

Advantageously, the axial bore is embodied as a stepped bore, and the region of increased diameter is embodied on the end of the actuating piston remote from the control chamber, and a guide pin is disposed in this region. This guide pin then defines the chamber which is located on the end remote from the control chamber of the actuating piston and in which the pressure prevailing in the control bore prevails.

To enable pressing the guide pin in a defined way against a wall of the valve body, this guide pin advantageously has a blind bore, which is located essentially in the axis of the axial bore of the actuating piston.

The actuating piston is embodied for instance as a stepped cylinder. The shoulder face of this stepped cylinder can then form the face of the actuating piston that is exposed to the pressure, exerted by the adjusting piston on the actuating piston by means of the hydraulic chamber.

The shoulder face can be oriented in such a way that the actuating piston moves in the direction away from the control bore when the actuator unit is actuated.

The actuating piston can be prestressed in the closing direction by means of a compression spring disposed in a spring chamber. The spring chamber can be in communication with the return conduit, so that the pressure prevailing in the return conduit is present in the spring chamber as well.

To assure, even when there is a different radial play of the adjusting piston and of the actuating piston, that the same pressure always prevails in the hydraulic chamber as in the spring chamber, the spring chamber can communicate via a pressure equalization conduit with an annular chamber, which is formed by an annular groove embodied on the circumference of the adjusting piston.

BRIEF DESCRIPTION OF THE DRAWINGS

Exemplary embodiments of the valve of the invention are described more fully herein below, in conjunction with the drawings, in which.

DESCRIPTION OF THE PREFERRED EMBODIMENTS

Figure 1:
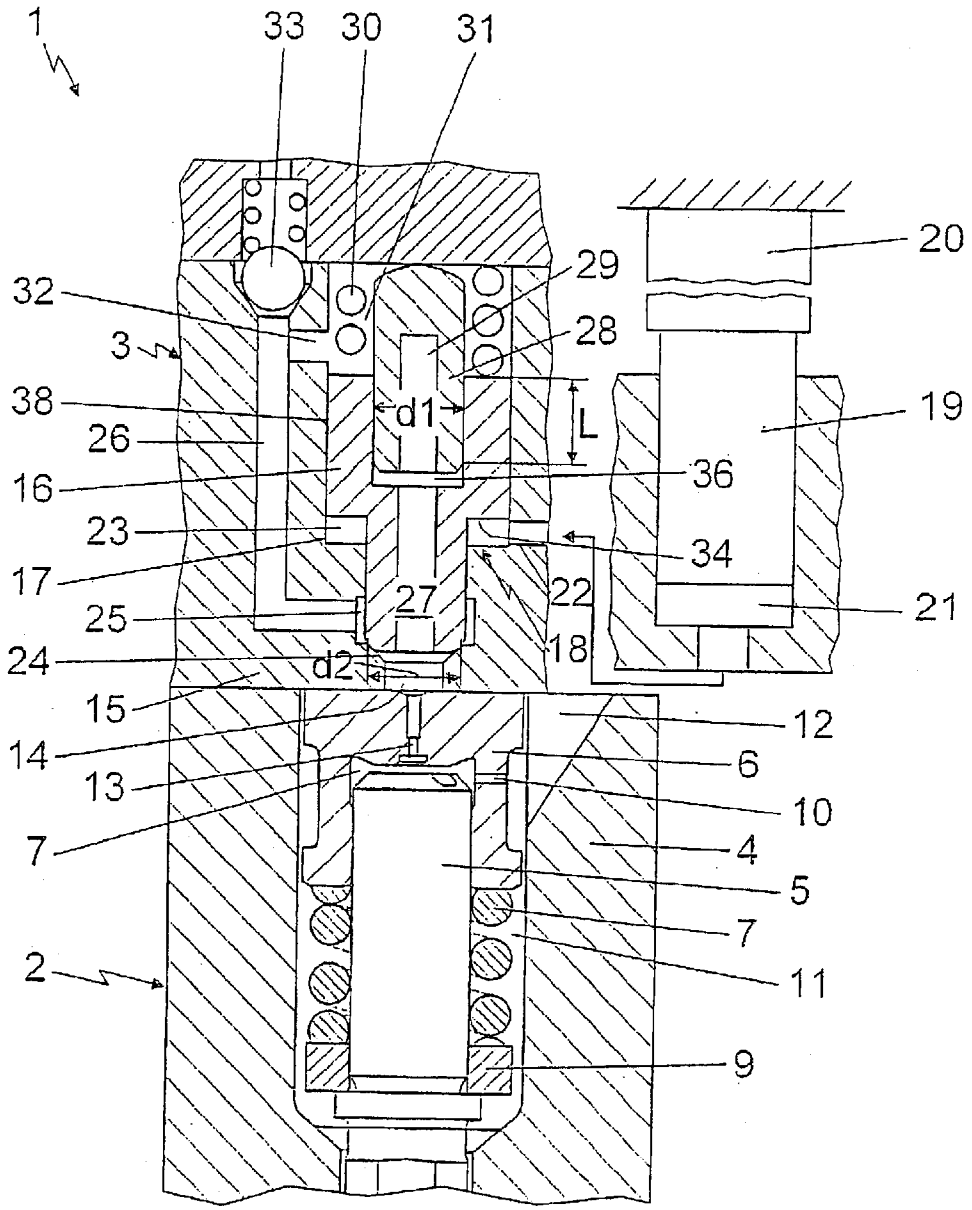
FIG. 1, a region relevant to the invention of an injection valve with a valve control unit of the invention, in longitudinal section.

The exemplary embodiment shown in the drawings has a fuel injection valve 1, which is intended for installation in an internal combustion engine, not shown, of a motor vehicle and is embodied here as a common rail injector for injecting preferably Diesel fuel. To that end, as its essential structural units, the fuel injection valve 1 includes a nozzle module 2 and a valve control module 3.

The nozzle module 2 includes a nozzle body 4, in which a so-called valve control piston 5 is disposed, which is in operative communication with, or forms a structural unit with, a nozzle needle, not shown here, which controls an opening of the injection valve 1 leading to a combustion chamber of the engine.

Also disposed in the nozzle module 2 is a spring plate 6, in which the free end of the valve control piston 5 is guided and which together with the latter defines a valve control chamber 7. The spring plate 6 is braced via a spring 8 on a support 9 that is connected to the valve control piston 5.

A radially outward-oriented, so-called inlet throttle 10 is embodied in the spring plate 6, or in its wall surrounding the receptacle for the valve control piston 5, and this throttle leads from the valve control chamber 7 to a high-pressure chamber 11, which is embodied between the outer contour of the spring plate 6 and the nozzle body 4 surrounding it and which communicates with a high-pressure reservoir, not shown here, or so-called common rail via a fuel supply line 12. In the axial direction, the valve control chamber 7 is in communication, via a so-called outlet throttle 13, with a control chamber 14 that is associated with the valve control module 3.

The position of the valve control piston 5 and thus of the nozzle needle is controlled via the pressure level in the valve control chamber 7. This level is adjusted in turn by means of the valve control module 3.

The valve control module 3 includes a control module body 15, in which a stepped actuating piston 16 is guided in a stepped bore 17. Via a hydraulic chamber 18, the actuating piston 16 is in operative communication with an adjusting piston 19. The adjusting piston 19 can be disposed at any arbitrary place inside or outside the control module body 15. It is actuated by means of an actuator unit 20, here embodied as a piezoelectric actuator.

Via the compensation volume of the hydraulic chamber 18, tolerances resulting from temperature gradients or different coefficients of temperature expansion of the materials used and possible settling effects can be compensated for, without a resultant change In the position of the actuating piston 16 to be triggered. The hydraulic chamber 18 here comprises a cylindrical chamber 21, associated with the adjusting piston 19 and defining the free face end thereof, and also comprises a conduit 22 and an annular chamber 23, surrounding the region of reduced diameter of the stepped actuating piston 16.

On the end toward the control chamber 14, the actuating piston 16 in the present exemplary embodiment is embodied as a valve closing body, which cooperates with a valve seat 24 and which in the closing direction disconnects the control chamber 14 from a so-called outlet chamber 25, from which a fuel return conduit 26 branches off, leading to a fuel tank, not shown here.

A conduit 27 oriented axially and embodied for instance as a bore is disposed in the actuating piston 16; it leads from the control chamber 14 to the end, remote from the control chamber, of the actuating piston 16 and widens in bore or region 36 of increased diameter.

A guide pin 28 is disposed in the region 36 of increased diameter and has a blind bore 29 on the side toward the control chamber 14.

The diameter d1 of the guide pin 28 and thus also the diameter of the bore region 36 is essentially equivalent to the diameter d2 of the valve seat 24, or in other words to the sealing diameter of the region, embodied as a valve closing body, of the actuating piston 16. The guide pin 28 is embodied such that it is guided with minimal play and a maximum guide length L in the bore region 36.

On the face end of the actuating piston 16 remote from the nozzle module 2, the nozzle module is engaged by a compression spring 30, which is disposed on a spring chamber 31 and surrounds the guide pin 28 and is braced on a wall of the control body 151. The spring chamber 31 communicates with the fuel return conduit 26 via a transverse conduit 32. Downstream of the discharge point of the transverse conduit 32, a pressure limiting valve 33 is disposed in the fuel return conduit 26.

The injection valve described above functions as follows:

In the closed state of the fuel injection valve 1, that is, when no voltage is applied to the piezoelectric actuator 20, the region, embodied as a valve closing body, of the actuating piston 16 is located on the valve seat 24 assigned to it. In this state, via the inlet throttle 10 in the valve control chamber 7 and thus via the outlet throttle 13 in the control chamber 14, the pressure prevailing in the high-pressure chamber 11 prevails, that is, in the present case the rail pressure. Via the bore 27, this pressure is transmitted onward into the chamber of the bore region 36 located between the guide pin 28 and the actuating piston 16.

The surface area of the free face end of the actuating piston 16 which is acted upon by the rail pressure and surrounds the orifice of the bore 27 corresponds to the surface area of the face, oriented parallel to it, of the actuating piston 16 that surrounds the orifice of the bore 27 into the bore region 36. Thus the same hydraulic force acts on the actuating piston 16 on its opposite sides, so that the actuating piston is supported in a hydraulically force-balanced fashion. The closing direction of the actuating piston 16 is assured by means of the compression spring 30, which exerts the requisite pressure on the actuating piston.

If the injection valve 1 is to be opened, or in other words if the injection nozzle, closed by means of the nozzle needle not shown here, is to be opened, a voltage is applied to the piezoelectric actuator 20, whereupon the piezoelectric actuator expands abruptly in the axial direction, that is, in the direction of the adjusting piston 19. The adjusting piston 19 is as a result displaced in the direction remote from the actuator 20. This in turn, via the hydraulic chamber 18, trips a displacement of the actuating piston 16, specifically in such a way that the pressure, imparted by the adjusting piston 19 via the hydraulic chamber 18, is exerted on the shoulder face 34 of the stepped actuating piston 16 and displaces it, counted to the pressure exerted by the compression spring 30, in the direction remote from the control chamber 14, thus establishing a communication between the control chamber 14 and the outlet chamber 25. As a result, fuel located in the control chamber 14 flows into the outlet chamber 25 and from there into the fuel return conduit 26. Via the outlet throttle 13, the valve control chamber 7 is relieve as a result, so that the pressure in it diminishes, and the valve control piston 5 is displaced in the direction of the valve control module 3. As a result, the opening leading to the combustion chamber of the engine is uncovered, so that fuel under high pressure that is located in the high-pressure chamber 11 is injected into the combustion chamber.

The fuel carried away via the fuel return conduit 26 flows back into the fuel tank once the pressure in the return conduit 26 exceeds a certain value, such as 30 bar. This means that this pressure is exerted into the spring chamber 31 and from there, via a leakage gap 38 surrounding the region of increased diameter of the actuating piston 16, into the annular chamber 23, the conduit 22, and the cylindrical chamber 21, so that filling of the hydraulic chamber 18 that may be necessary can take place at any time.

As already noted above, the guide pin 28 is guided with minimal play and a maximal guide length L in the bore 36 of the actuating piston 16. The ratio between the diameter d1 of the bore 36 and the sealing diameter d2 determines the hydraulic force that is exerted on the actuating piston 16. In the present case, this ratio is approximately equal to 1, so that the actuating piston 16 is supported in a hydraulically force-balanced manner. As a result, only a slight force, which can be exerted by means of the actuator 20, is needed to displace the actuating piston 16 by means of the adjusting piston 19.

If the voltage applied to the piezoelectric actuator 20 is interrupted, then the adjusting piston 19 is moved back again, and as a result the pressure prevailing in the hydraulic chamber 18 is reduced, and the actuating piston 16 is moved by the spring 30 in the direction of the nozzle module 2, until it comes to rest in the valve seat 24. As a result, the so-called rail pressure builds up again in the valve control chamber 7, so that the valve control 5 and thus the nozzle needle are move back into the closing direction.

Figure 2:
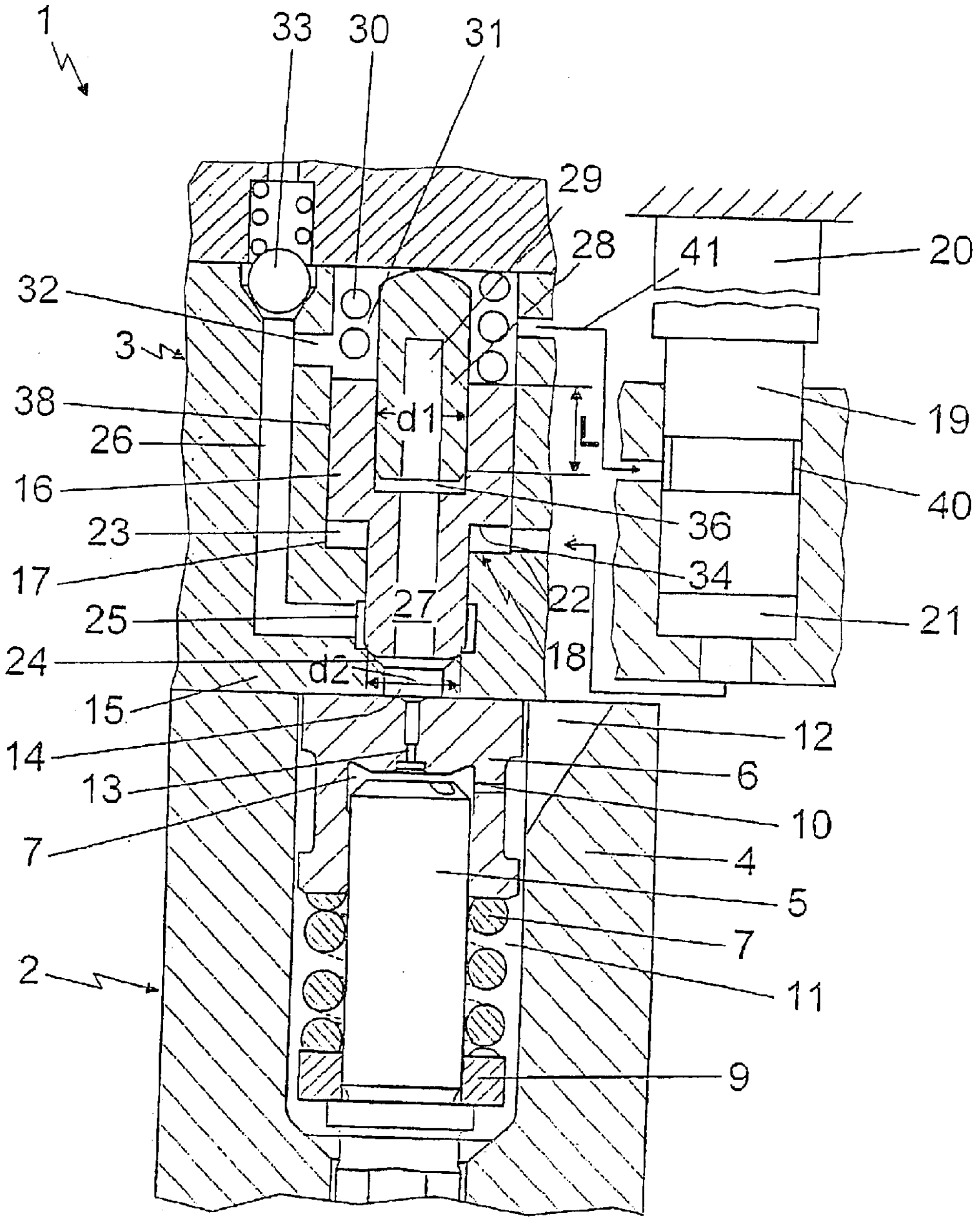
FIG. 2, an alternative embodiment of an injection valve embodied according to the invention, in longitudinal section.

The exemplary embodiment of FIG. 2, in which for reasons of simplicity the same reference numerals as in FIG. 1 are selected for functionally identical components, differs from that of FIG. 1 in that the spring chamber 31 communicates, via a pressure equalization conduit 41, with an annular chamber that is formed by an annular groove 40 of the adjusting piston 19.

By means of the pressure equalization conduit 41, it is assured that the same constant pressure as in the spring chamber 31 always prevails in the hydraulic chamber 21 as well. As a result, pressure differences that might occur because of the radial play of the actuating piston 16 in the stepped bore 17 and the radial play of the adjusting piston 19 in its guide bore are compensated for, so that constant loads on the piezoelectric actuator 20 always prevail, and variations in the injection quantities injected by means of the injection valve 1 are largely precluded.

The foregoing relates to preferred exemplary embodiment of the invention, it being understood that other variants and embodiments thereof are possible within the spirit and scope of the invention, the latter being defined by the appended claims.

What is claimed is:

1. A valve for controlling fluids, comprising a piezoelectric actuator unit (20) for actuating a valve member, which valve has at least one adjusting piston (19) and at least one actuating piston (16) that is guided in a valve body (15) and actuates a valve closing body, which valve closing body cooperates with at least one valve seat (24) embodied on the valve body (15) and in the closing direction disconnects a control bore (14) from an outlet chamber (25), from which a return conduit (26) branches off, wherein between the adjusting piston (19) and the actuating piston (16), a hydraulic chamber (18) is disposed, which transmits a motion of the adjusting piston (19) to the actuating piston (16), the actuating piston (16), at least when the valve closing body is closed, being supported essentially in a hydraulically force-balanced fashion.

2. The valve of claim 1, wherein the valve closing body is a constituent part of the actuating piston (16).

3. The valve of claim 1, wherein the actuating piston (16) has an axial bore (27) that branches off from the control chamber (14) and extends through the actuating piston (16).

4. The valve of claim 2, wherein the actuating piston (16) has an axial bore (27) that branches off from the control chamber (14) and extends through the actuating piston (16).

5. The valve of claim 3, wherein the axial bore (27) is embodied as a stepped bore, and a guide pin (28) is disposed in an enlarged diameter bore region (36) of actuating piston (16).

6. The valve of claim 4, wherein the axial bore (27) is embodied as a stepped bore, and a guide pin (28) is disposed in an enlarged diameter bore region (36) of actuating piston (16).

7. The valve of claim 3, wherein the diameter (d1) of the bore region (36) of enlarged diameter is equivalent to the sealing diameter (d2) of the valve closing body.

8. The valve of claim 4, wherein the diameter (d1) of the bore region (36) of enlarged diameter is equivalent to the sealing diameter (d2) of the valve closing body.

9. The valve of claim 5, wherein the guide pin (28) as a blind bore (29), which is located essentially in the axis of the axial bore (27) of the actuating piston.

10. The valve of claim 6, wherein the guide pin (28) as a blind bore (29), which is located essentially in the axis of the axial bore (27) of the actuating piston.

11. The valve of claim 1, wherein the actuating piston (16) is embodied essentially as a stepped cylinder.

12. The valve of claim 1, wherein the actuating piston (16), upon actuation of the actuator unit (20), moves in the direction remote from the control bore (14).

13. The valve of claim 1, wherein the actuating piston (16) is prestressed in the closing direction by means of a compression spring (30) disposed in a spring chamber (31).

14. The valve of claim 13, wherein the spring chamber (31) communicates with the return conduit (26).

15. The valve of claim 1, wherein an over pressure valve (33) is disposed in the return conduit (26).

16. The valve of claim 11, wherein the shoulder face (34) of the actuating piston (16) forming a stepped cylinder forms the face of the actuating piston (16) on which the pressure, exerted on the actuating piston (16) by the adjusting piston (19) by means of the hydraulic chamber (18), acts.

17. The valve of claim 13, wherein the spring chamber (31) communicates via a pressure equalization conduit (41) with an annular chamber, which is formed from an annular groove (40) that is embodied on the circumferential surface of the adjusting piston (19).

18. The valve of claim 14, wherein the spring chamber (31) communicates via a pressure equalization conduit (41) with an annular chamber, which is formed from an annular groove (40) that is embodied on the circumferential surface of the adjusting piston (19).

19. The valve of claim 15, wherein the spring chamber (31) communicates via a pressure equalization conduit (41) with an annular chamber, which is formed from an annular groove (40) that is embodied on the circumferential surface of the adjusting piston (19).

20. The valve of claim 16, wherein the spring chamber (31) communicates via a pressure equalization conduit (41) with an annular chamber, which is formed from an annular groove (40) that is embodied on the circumferential surface of the adjusting piston (19).

* * * * *